(12) United States Patent
Zheng et al.

(10) Patent No.: US 8,561,942 B2
(45) Date of Patent: Oct. 22, 2013

(54) GAS TURBINE ENGINE MOUNTING STRUCTURE WITH SECONDARY LOAD PATHS

(75) Inventors: Zhijun Zheng, Avon, CT (US); David F. Sandy, Milford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/366,541

(22) Filed: Feb. 6, 2012

(65) Prior Publication Data

US 2013/0200211 A1 Aug. 8, 2013

(51) Int. Cl.
*B64D 27/00* (2006.01)

(52) U.S. Cl.
USPC ............................................. 244/54; 248/554

(58) Field of Classification Search
USPC ........ 244/54, 55, 53 R; 60/796–797; 248/554
See application file for complete search history.

(56) References Cited

U.S. PATENT DOCUMENTS

| | | | |
|---|---|---|---|
| 5,275,357 A * | 1/1994 | Seelen et al. | ..................... 244/54 |
| 5,277,382 A | 1/1994 | Seelen et al. | |
| 5,871,177 A | 2/1999 | Demouzon et al. | |
| 5,927,644 A | 7/1999 | Ellis et al. | |
| 6,347,765 B1 | 2/2002 | Jule et al. | |
| 6,474,597 B1 | 11/2002 | Cazenave | |
| 6,843,449 B1 | 1/2005 | Manteiga et al. | |
| 7,325,770 B2 * | 2/2008 | Chevalier et al. | ............... 244/54 |
| 2008/0169378 A1 | 7/2008 | Beaufort et al. | |

FOREIGN PATENT DOCUMENTS

EP 1103463 A1 5/2001

OTHER PUBLICATIONS

International Search Report and Written Opinion for International Application No. PCT/US2013/024694 completed May 27, 2013.

* cited by examiner

*Primary Examiner* — Timothy D Collins
*Assistant Examiner* — Jessica Bowen
(74) *Attorney, Agent, or Firm* — Carlson, Gaskey & Olds P.C.

(57) ABSTRACT

A connection for mounting an aircraft engine to an aircraft pylon includes a plate to be connected to a portion of an engine, and a body that extends rearward from the plate. A back-up connection, including a pin positioned within a slotted hole, is provided between the portion of the engine and the body. When there is a normal connection between the plate and the body, there is clearance between the pin and the slotted hole.

20 Claims, 5 Drawing Sheets

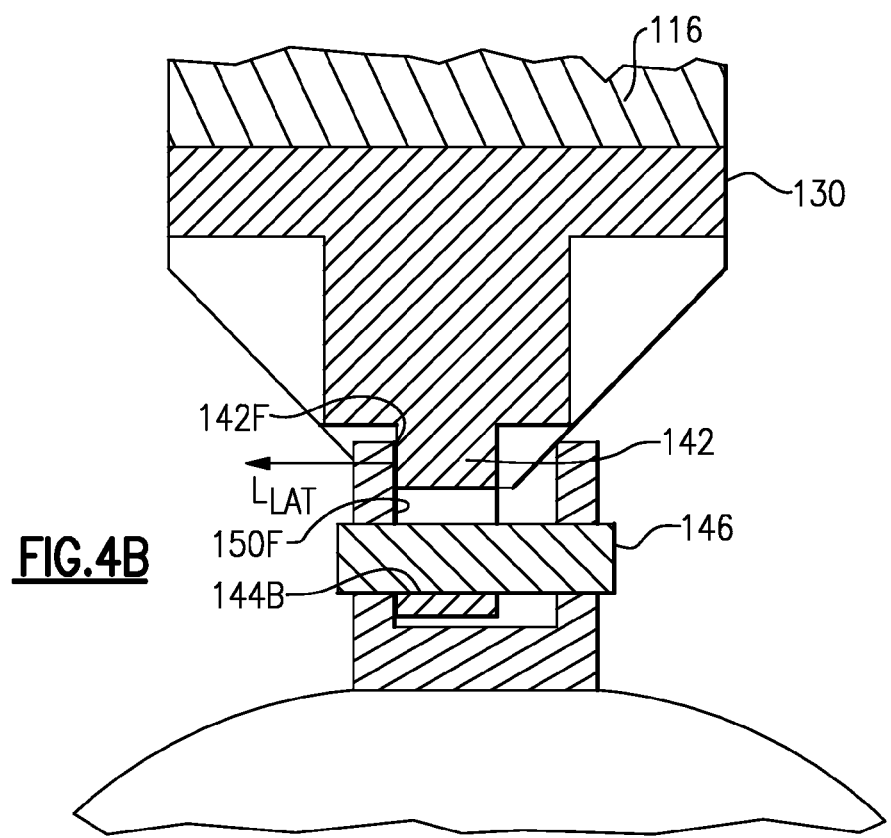
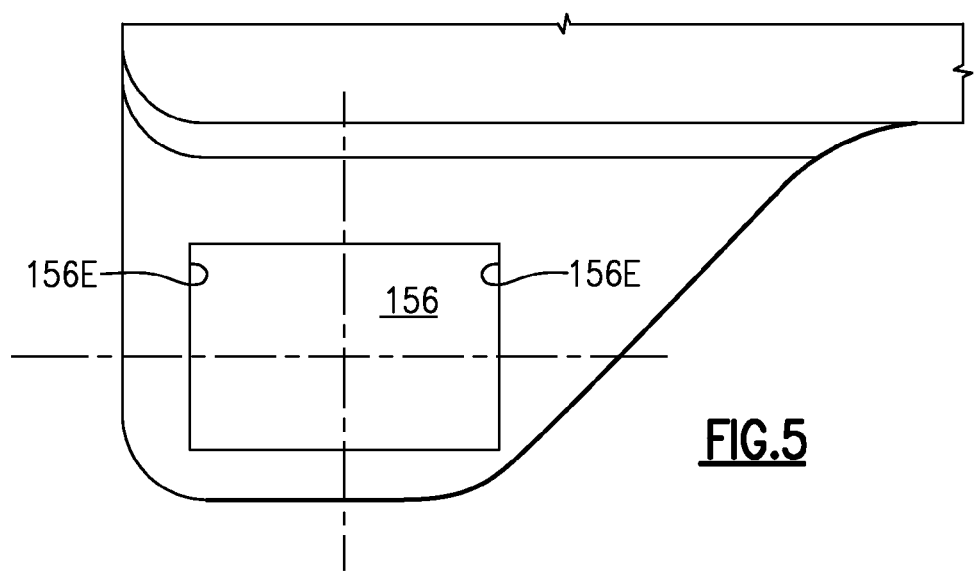

GAS TURBINE ENGINE MOUNTING STRUCTURE WITH SECONDARY LOAD PATHS

BACKGROUND OF THE INVENTION

Gas turbine engines are typically mounted to an aircraft by attaching a pylon to an aircraft frame, and attaching the engine at forward and rear locations to the pylon.

A structure, known as a wiffle tree or balance beam, is utilized to provide a path for engine thrust loads between a pair of thrust links and the mount body. Further, a shackle plate is mounted between the compressor housing and mount body to provide vertical and lateral load paths.

SUMMARY OF THE INVENTION

In a featured embodiment, a connection for mounting an aircraft engine to an aircraft pylon has a plate to be connected to a portion of an aircraft engine, and a body extending rearward from the plate. There is a back-up connection between the portion of the aircraft engine and the body. The back-up connection includes a pin positioned within a slotted hole, with a clearance between the pin and the slotted hole when there is a normal connection between the plate and the body.

In another embodiment according to the previous embodiment, the pin contacts the slotted hole when there is a failed connection between the plate and body.

In another embodiment according to the previous embodiment, the pin contacts a bottom of the slotted hole when there is a failed connection between the plate and body.

In another embodiment according to the previous embodiment, the pin is supported by two lugs attached to the portion of the aircraft engine.

In another embodiment according to the previous embodiment, the body includes a tang at a lower end thereof, with the slotted hole provided in the tang.

In another embodiment according to the previous embodiment, the lugs are arranged on opposed sides of the tang. There is a clearance between the lugs and the tang when there is a normal connection between the plate and body.

In another embodiment according to the previous embodiment, one of the lugs contacts a respective one of the opposed sides of the tang when there is a failed connection between the plate and the body.

In another embodiment according to the previous embodiment, the slotted hole has a length from a first end to a second end. The slotted hole has a height from a bottom of the slotted hole to a top.

In another embodiment according to the previous embodiment, the length of the slotted hole is greater than the height of the slotted hole.

In another embodiment according to the previous embodiment, each of the length and height of the slotted hole is greater than a diameter of the pin.

In another embodiment according to the previous embodiment, the length of the slotted hole is arranged substantially parallel to an axis of rotation of the aircraft engine.

In another embodiment according to the previous embodiment, the pin is positioned generally perpendicular to the axis of rotation of the engine.

In another featured embodiment, an aircraft has an engine mounted to an aircraft pylon. A connection mounts the engine to the pylon. The connection includes a plate connected to a portion of the, and a body extending rearward from the plate. A back-up connection is provided between the portion of the aircraft engine and the body. The back-up connection includes a pin positioned within a slotted hole, with clearance between the pin and the slotted hole when there is a normal connection between the plate and body.

In another embodiment according to the previous embodiment, the slotted hole has a length from a first end to a second end. The slotted hole has a height from a bottom of the slotted hole to a top. The length of the slotted hole is greater than the height of the slotted hole.

In another embodiment according to the previous embodiment, when there is a failed connection between the plate and the body, the pin contacts a bottom of the slotted hole without contacting either of the ends of the slotted hole.

These and other features of this application will be best understood from the following drawings and detailed description.

BRIEF DESCRIPTION OF THE DRAWINGS

The drawings can be briefly described as follows:

FIG. 4B is a view similar to FIG. 3B, but illustrates a failed connection between the shackle plate and the body.

FIG. 5 illustrates an alternate slotted hole that can be used with the disclosed back-up connection.

DETAILED DESCRIPTION

Figure 1:
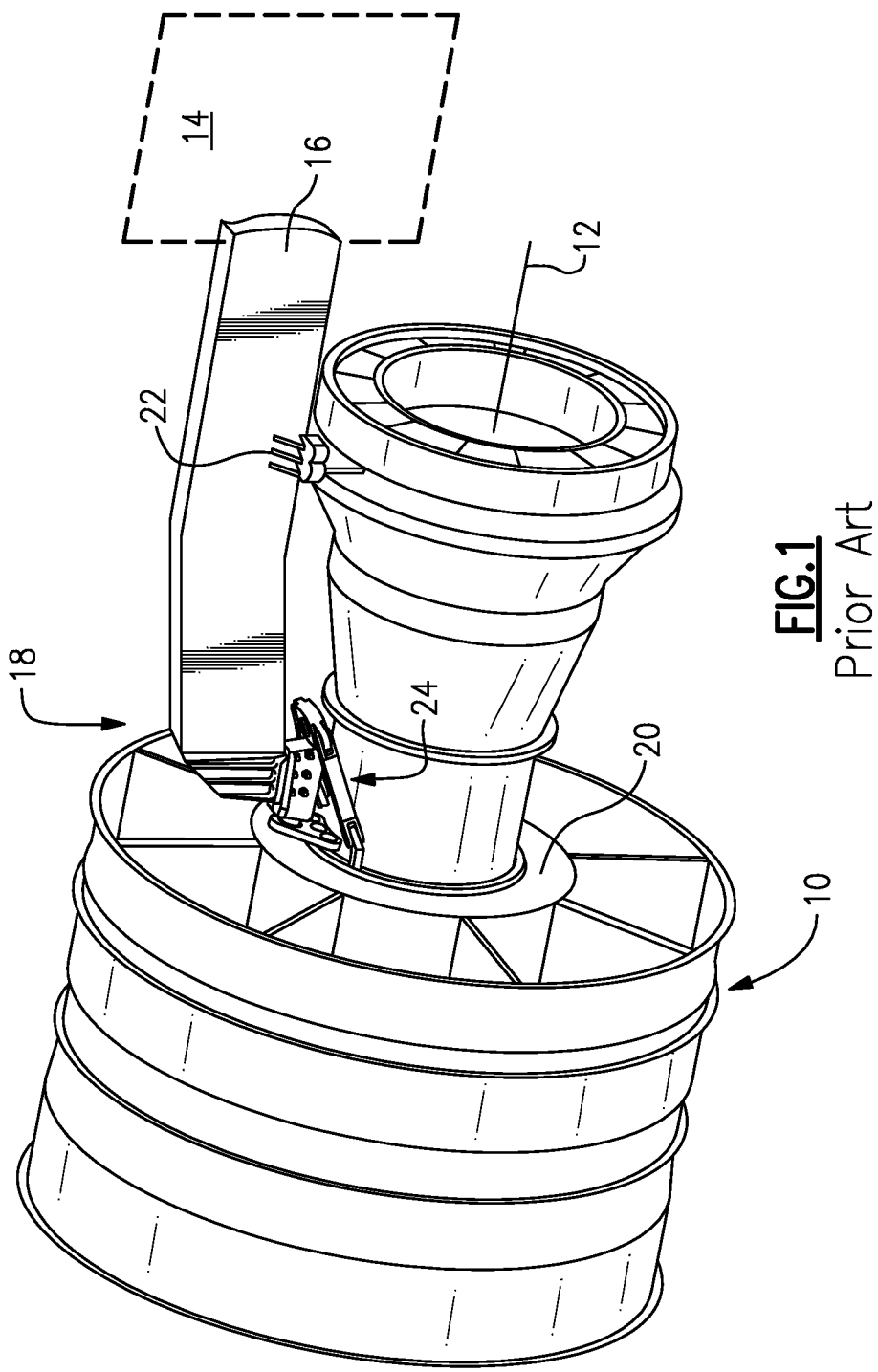
FIG. 1 is a perspective, schematic illustration of a typical attachment of an aircraft engine to an aircraft frame.

With reference to FIG. 1, an aircraft engine 10, generally defined about an engine axis of rotation 12, is known to be mounted to an aircraft frame, shown schematically at 14, through a pylon 16. There is typically a forward mount structure 18, which attaches the pylon 16 to a compressor housing 20, as well as a rear mount structure 22. It is possible that another portion of the engine 10, other than the compressor housing 20, could be used to mount the engine 10 to the pylon.

Figure 2:
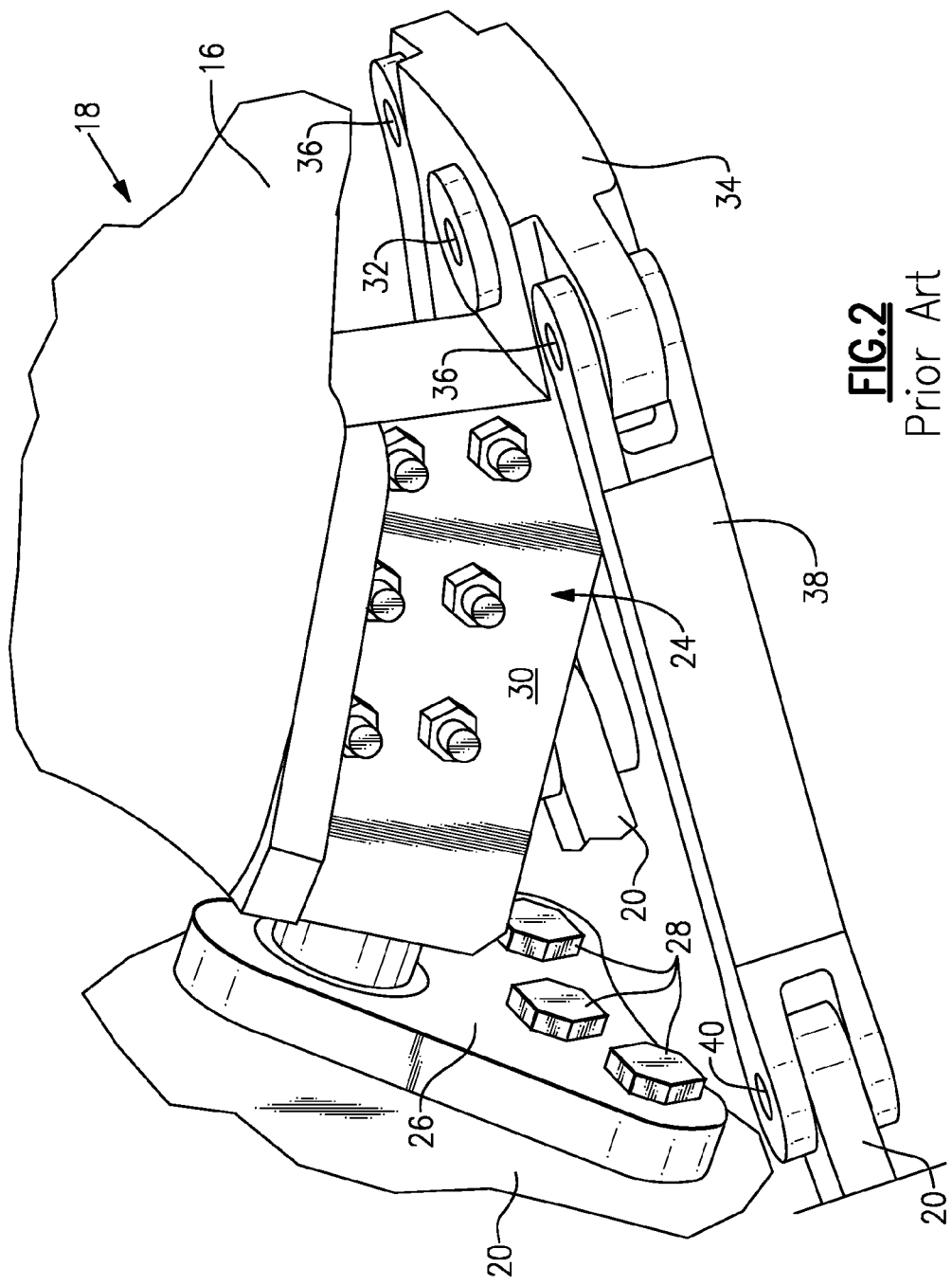
FIG. 2 shows detail of FIG. 1.

The forward mount structure 18 may include an arrangement 24 known as a "wiffle tree." As shown in FIG. 2, the arrangement 24 includes a shackle plate 26 which is connected to the compressor housing 20, here by a number of bolts 28. A body 30 extends rearward from the shackle plate 26, and is pinned at 32 such that it can pivot relative to a balance beam 34. The balance beam 34 is pivotally mounted at 36 to a pair of thrust links 38. Thrust links 38 are connected to the compressor housing 20 by pins 40. Again, while the compressor housing 20 is shown, the thrust links 38 could attach to another portion of the engine 10.

Forces from the compressor housing 20 are transmitted to the pylon 16 through the thrust links 38, and the connection with the shackle plate 26. The connection between the shackle plate 26 and the body 30 is primarily responsible for reacting to vertical loads (such as from the weight of the engine), as well as lateral loads (such as those typically experienced during flight), while the body 30 reacts axial, or thrust loads, primarily by way of the thrust links 38. If the connection between the shackle plate 26 and the body 30 should fail, reaction forces may no longer be properly directed between the engine 10 and the pylon 16.

Figure 3A:
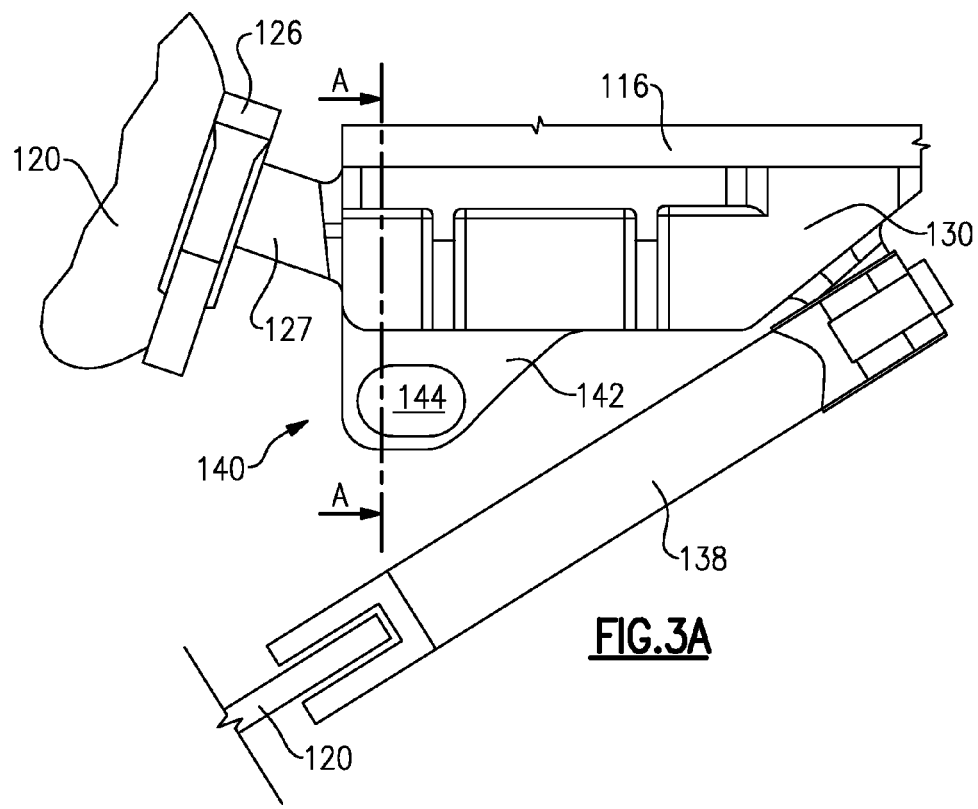
FIG. 3A illustrates a side view of the disclosed mount structure.

FIG. 3A shows a back-up connection 140 (or, a "waiting" connection) to react to both vertical and lateral loads when there is a failed connection between the body 130 and the shackle plate 126. To the extent not otherwise described or shown, the reference numbers in FIG. 3A correspond to those of FIGS. 1-2, with similar parts having reference numerals preappended with a "1."

The back-up connection 140 includes a tang 142 positioned adjacent to a lower end of the body 130. The tang 142 is provided with a slotted hole 144, within which a pin 146 is received, as illustrated in the cross-sectional view of FIG. 3B. The pin 146 is supported within the slotted hole 144 by two lugs 148, 150 which are part of a clevis arrangement 152 attached to an exterior of a compressor case 154. The clevis arrangement 152 could be mounted to another portion of the engine. In the example shown, the length 144L of the slotted hole 144 is arranged generally parallel to an engine axis of rotation, while the length of the pin 146 is oriented generally perpendicular to the engine axis of rotation.

The slotted hole 144 is non-circular, and includes a length 144L greater than its height 144H. Further, both the length 144L and height 144H are greater than a diameter 146D of the pin 146. In the example of FIG. 3A the slotted hole 144 is shown with rounded ends, and may be referred to as a "racetrack" hole because its shape resembles that of a race-track. In another example the slotted hole can include squared ends 156E, as in the slotted hole 156 of FIG. 5, although these squared ends 156E could potentially cause undesirable stress concentrations at the corners. In either case, the slotted hole is, again, non-circular with a length greater than its height.

Figure 3B:
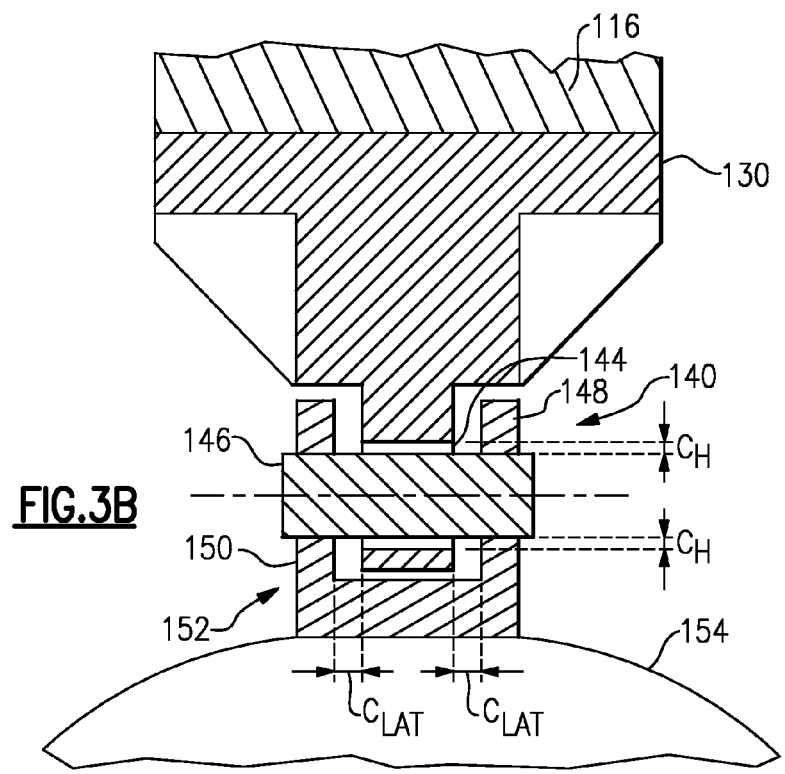
FIG. 3B is a cross-sectional view taken along line A-A from FIG. 3A.
Figure 3C:
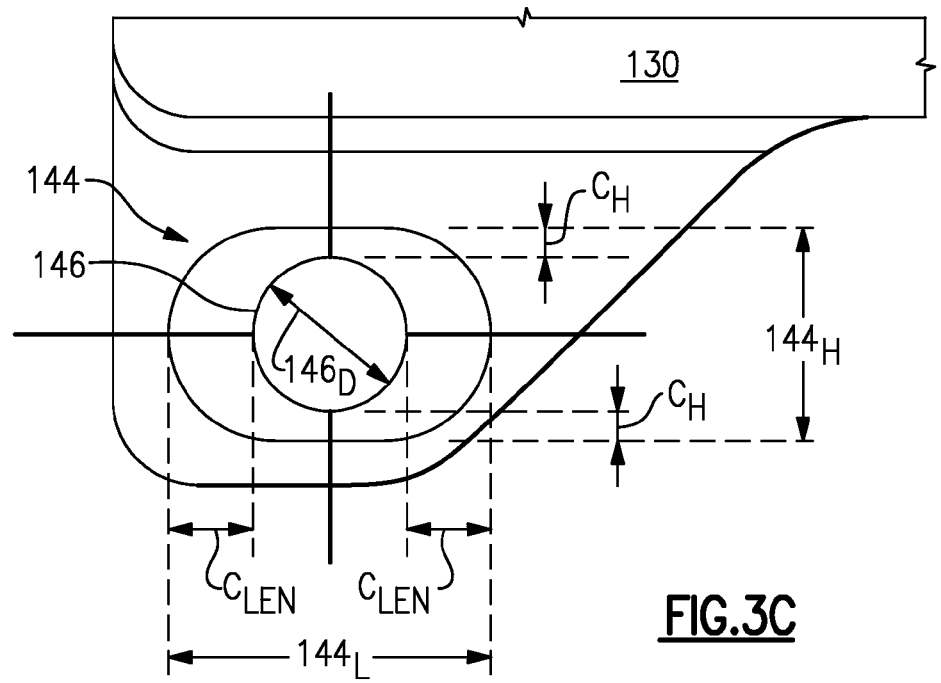
FIG. 3C is a close-up view of the back-up connection from FIG. 3A when there is a normal connection between the shackle plate and the body.

FIGS. 3A-3C represent an "intact" condition in which there is a normal connection between the compressor housing 120 and the body 130 by way of the shackle plate 126. In this condition, forces from the engine are reacted by the body 130 through its connection with the shackle plate 126, as well as the connection between the body 130 and the thrust links 138, as generally explained above.

In this "intact" condition, no force is transmitted from the engine to the body 130 by way of the back-up connection 140. Instead, there is a clearance between the pin 146 and the slotted hole 144, such that there is no contact therebetween. This clearance is represented between FIGS. 3B-3C as clearance relative to the height $C_H$ of the slotted hole 144 and clearance relative to the length $C_{LEN}$ of the slotted hole 144. There is further a clearance in a lateral direction $C_{LAT}$ between the lugs 148, 150 and the tang 142 such that, again, no force is transmitted between the engine and the body 130 via the back-up connection 140.

Should the connection between the body 130 and the shackle plate 126 fail, however, the back-up connection 140 will react the vertical and lateral loads previously reacted by way of the connection between the shackle plate 126 and the body 130. A failed connection between the shackle plate 126 and the body 130 is defined as any condition in which the body 130 can no longer react forces from the engine by way of the shackle plate 126 as it does in the intact condition described above. This includes cracking of the shackle plate 126, the bolts holding the shackle plate 126 to the compressor housing 120 becoming unfastened, a fracture of the link 127 between the shackle plate 126 and the body 130, etc.

Figure 4A:
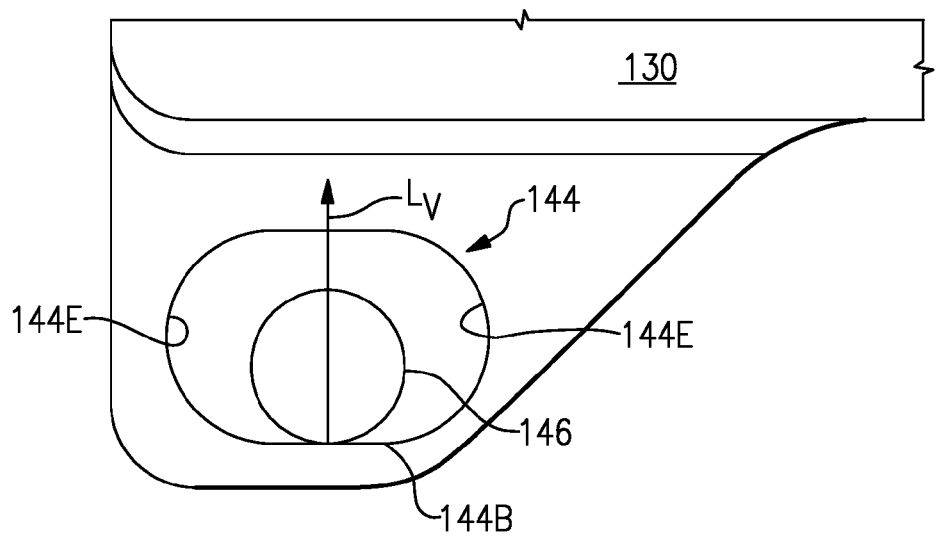
FIG. 4A is a view similar to FIG. 3C, but illustrates a failed connection between the shackle plate and the body.

When there is a failed connection between the shackle plate 126 and the body 130, the engine will drop relative to the body 130. The pin 146 will likewise drop relative to the slotted hole 144, and will contact a bottom 144B of the slotted hole 144, as illustrated in FIG. 4A. The body 130 will then react to the weight of the engine, as well as any other vertical loads, by way of the connection between the pin 146 and the slotted hole 144B, as schematically represented by the vertical load $L_v$.

Without the connection between the shackle plate 126 and the body 130, the compressor housing 120 will move laterally relative to the body 130 depending on flight maneuvers, etc. As shown in FIG. 4B, the body 130 reacts a lateral load from the engine, by way of contact between faces 142F, 150F of the tang 142 and the lug 150, as represented schematically by the lateral load $L_{LAT}$. This is one example of a reaction of a lateral load, and it should be understood that the tang 142 is capable of reacting to a lateral load from either lateral side.

Accordingly, the back-up connection 140 is capable of reacting to both vertical and lateral loads, by providing a secondary path for these loads in addition to the normal load path between the shackle plate 126 and the body 130.

Further, the back-up connection 140 is statically determinant in nature. Because the slotted hole is provided with a length 144L greater than its height 144H, and is thus non-circular, the body 130 does not react to loads in the fore and aft directions, such as thrust loads, by way of the back-up connection 140. In other words, the length 144L of the slotted hole is such that, when there is a failed connection between the shackle plate 126 and the body 130, the pin 146 will not contact the ends 144E of the slotted hole 144. Accordingly, because the back-up connection 140 is statically determinant, the manner in which the back-up connection 140 reacts to critical load conditions can be relatively easily modeled.

Although the different examples have the specific components shown in the illustrations, embodiments of this invention are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A connection for mounting an aircraft engine to an aircraft pylon comprising:
   a plate to be connected to a portion of an aircraft engine, and a body extending rearward from said plate;
   a back-up connection between said portion of said aircraft engine and said body, said back-up connection including a pin positioned within a slotted hole, there being clearance between said pin and said slotted hole when there is a normal connection between said plate and said body, said pin positioned substantially perpendicular to an axis of rotation of said engine.

2. The connection as set forth in claim 1, wherein said pin contacts said slotted hole when there is a failed connection between said plate and said body.

3. The connection as set forth in claim 2, wherein said pin contacts a bottom of said slotted hole when there is a failed connection between said plate and said body.

4. The connection as set forth in claim 1, wherein said pin is supported by two lugs attached to said portion of said aircraft engine.

5. The connection as set forth in claim 4, wherein said body includes a tang at a lower end thereof, said slotted hole provided in said tang.

6. The connection as set forth in claim 5, wherein each of said lugs are arranged on opposed sides of said tang, there being a clearance between said lugs and said tang when there is a normal connection between said plate and said body.

7. The connection as set forth in claim 6, wherein one of said lugs contacts a respective one of said opposed sides of said tang when there is a failed connection between said plate and said body.

8. The connection as set forth in claim 1, wherein said slotted hole has a length from a first end to a second end, and wherein said slotted hole has a height from a bottom of said slotted hole to a top.

9. The connection as set forth in claim 8, wherein said length of said slotted hole is greater than said height of said slotted hole.

10. The connection as set forth in claim 9, wherein each of said length and height of said slotted hole is greater than a diameter of said pin.

11. A connection for mounting an aircraft engine to an aircraft pylon comprising:
a plate to be connected to a portion of an aircraft engine, and a body extending rearward from said plate;
a back-up connection between said portion of said aircraft engine and said body, said back-up connection including a pin positioned within a slotted hole, there being clearance between said pin and said slotted hole when there is a normal connection between said plate and said body; and
wherein said slotted hole has a length from a first end to a second end, said slotted hole having a height from a bottom of said slotted hole to a top, said length of said slotted hole being greater than said height of said slotted hole, each of said length and said height of said slotted hole being greater than a diameter of said pin, and wherein said length of said slotted hole is arranged substantially parallel to an axis of rotation of said aircraft engine.

12. The connection as set forth in claim 11, wherein said pin is positioned substantially perpendicular to said axis of rotation of said engine.

13. An aircraft comprising:
an engine mounted to an aircraft pylon;
a connection mounting said engine to said pylon, said connection including a plate connected to a portion of said engine, and a body extending rearward from said plate; and
aback-up connection between said portion of said aircraft engine and said body, said back-up connection including a pin positioned within a slotted hole, there being clearance between said pin and said slotted hole when there is a normal connection between said plate and said body, wherein a length of said slotted hole is arranged substantially parallel to an axis of rotation of said aircraft engine.

14. The aircraft as set forth in claim 13, wherein said slotted hole has a length from a first end to a second end, and wherein said slotted hole has a height from a bottom of said slotted hole to a top, said length of said slotted hole is greater than said height of said slotted hole.

15. The aircraft as recited in claim 14, wherein, when there is a failed connection between said plate and said body, said pin contacts a bottom of said slotted hole without contacting either of said ends of said slotted hole.

16. The connection as set forth in claim 1, wherein the entirety of said body is positioned rearward of said plate.

17. The aircraft as set forth in claim 13, wherein the entirety of said body is positioned rearward of said plate.

18. The connection as set forth in claim 1, wherein, when there is a normal connection between said body and said plate, forces from said engine are transmitted by the connection between said body and said plate without being transmitted by said back-up connection.

19. The aircraft as set forth in claim 13, wherein, when there is a normal connection between said body and said plate, forces from said engine are transmitted by the connection between said body and said plate without being transmitted by said back-up connection.

20. The aircraft as set forth in claim 13, wherein said length of said slotted hole extends from a first end to a second end, said slotted hole has a height from a bottom of said slotted hole to a top, said length of said slotted hole greater than said height of said slotted hole.

* * * * *

UNITED STATES PATENT AND TRADEMARK OFFICE
CERTIFICATE OF CORRECTION

| | | |
|---|---|---|
| PATENT NO. | : 8,561,942 B2 | Page 1 of 1 |
| APPLICATION NO. | : 13/366541 | |
| DATED | : October 22, 2013 | |
| INVENTOR(S) | : Zheng et al. | |

It is certified that error appears in the above-identified patent and that said Letters Patent is hereby corrected as shown below:

IN THE CLAIMS:

Claim 13, column 6, line 5: "aback-up" should read as --a back-up--

Signed and Sealed this
Eighteenth Day of March, 2014

Michelle K. Lee
*Deputy Director of the United States Patent and Trademark Office*